United States Patent
Wei (10) Patent No.: US 7,519,973 B2
(45) Date of Patent: Apr. 14, 2009

(54) PROVIDING UNIQUE EVENT NOTIFICATION TO ENABLE FIRMWARE TO REQUEST THAT AN OPERATING SYSTEM PERFORM A UNIQUE ACTION

(75) Inventor: Dong Wei, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 217 days.

(21) Appl. No.: 10/951,956

(22) Filed: Sep. 29, 2004

(65) Prior Publication Data

US 2006/0075171 A1    Apr. 6, 2006

(51) Int. Cl.
*G06F 9/44* (2006.01)

(52) U.S. Cl. .......................................... 719/318

(58) Field of Classification Search ................. 719/310, 719/318; 717/116, 174; 713/1, 2, 320; 709/204, 709/219, 248; 714/30; 707/103 R
See application file for complete search history.

(56) References Cited

U.S. PATENT DOCUMENTS

| | | | | |
|---|---|---|---|---|
| 5,920,692 | A * | 7/1999 | Nguyen et al. | 709/204 |
| 6,212,676 | B1 * | 4/2001 | Seaman et al. | 717/116 |
| 6,477,585 | B1 * | 11/2002 | Cohen et al. | 719/318 |
| 6,560,655 | B1 * | 5/2003 | Grambihler et al. | 709/248 |
| 6,598,169 | B1 * | 7/2003 | Warwick et al. | 713/320 |
| 6,725,281 | B1 * | 4/2004 | Zintel et al. | 719/318 |
| 6,892,322 | B1 * | 5/2005 | Snyder | 714/30 |
| 7,069,309 | B1 * | 6/2006 | Dodrill et al. | 709/219 |
| 7,162,492 | B2 * | 1/2007 | Yokoshi | 707/103 R |
| 7,165,170 | B2 * | 1/2007 | Rothman et al. | 713/1 |
| 2002/0178243 | A1 * | 11/2002 | Collins | 709/223 |
| 2005/0132357 | A1 * | 6/2005 | Shell et al. | 717/174 |
| 2006/0047946 | A1 * | 3/2006 | Keith | 713/2 |

* cited by examiner

*Primary Examiner*—Van H Nguyen (57) ABSTRACT

A method of providing a unique event notification for performing an action on hardware is provided. In one embodiment, an object accessor accesses an object that represents hardware. A notification value accessor accesses a notification value. A universally unique identifier (UUID) accessor accesses a UUID, and a unique action designator computes a unique action designation based on the notification value and the UUID.

12 Claims, 5 Drawing Sheets

Template That Describes an Event Notification Interface

*Notify2 (Notify2)*

```
Notify2Term := Notify2 (
    310 ~Object,              //Supername=> ThermalZone | Processor | Device
    320 ~Notification Value,  // TermArg=>ByteConstExpr
    330 ~UUID                 // Nothing | UUID
    )
```

PROVIDING UNIQUE EVENT NOTIFICATION TO ENABLE FIRMWARE TO REQUEST THAT AN OPERATING SYSTEM PERFORM A UNIQUE ACTION

TECHNICAL FIELD

Embodiments of the present invention relate to performing actions pertaining to hardware. More specifically, embodiments of the present invention relate to providing unique event notifications for performing actions pertaining to hardware.

BACKGROUND ART

Since the advent of computers, various types of hardware have been associated with computers. Examples of hardware include devices, processors, and thermal zones, among other things. Examples of devices include, but are not limited to, hard drives, tape drives, tape controllers, and Small Computer System Interface (SCSI) controllers. Thermal zones frequently include a set of devices that are used for sensing the temperature of various other pieces of hardware and/or for cooling other pieces of hardware.

Frequently actions pertaining to hardware need to be performed, for example, when something happens to the hardware. In this case, an administrator or a user may interact with the computer to indicate what action they want performed and what hardware they want the action performed on. Additionally, the system itself may detect that an action needs to be taken with regards to hardware. Examples of these actions include, but are not limited to, deleting hardware from the computer, adding hardware to the computer, causing a disk drive to read or eject a disk, dynamic reconfiguration of hardware, etc.

Platforms that run on Intel and AMD processors use event notification interfaces (referred to hereinafter as "legacy event notification interfaces") defined by the Advanced Configuration and Power Interface (ACPI) specification. These platforms support operating systems that include, but are not limited to, Linux, Windows™, HP-UX™. With ACPI, the firmware on the computer requests that the action be performed on the hardware by a legacy event notification interface to create an event notification (referred to hereinafter as a "legacy event notification"). The firmware communicates the legacy event notification to the operating system of the computer and the operating system performs the action on the hardware.

It is essential that the operating system be able to differentiate one type of action from another type of action. The legacy event notification interface uses a 1 byte notification value to differentiate one type of action, and hence to differentiate between the legacy event notification interfaces and the respective event notifications. The value for the notification value is determined by an ACPI standards committee.

The legacy event notification interfaces provided by ACPI require that companies divulge confidential information or intellectual property (IP) to the ACPI standards committee in order to obtain a notification value. Also, the committee is mostly concerned with developing interfaces for features that can be used by a wide range of companies and products. These features are commonly known as "baseline features." Therefore, the committee is not motivated to help companies develop interfaces for features that are unique to their products or model line of products. These features are known as "value added features." Third, the notification value is limited to 1 byte and therefore, there is a limit on the number of legacy event notification interfaces that the ACPI standards committee can authorize.

DISCLOSURE OF THE INVENTION

Embodiments of the present invention pertain to methods and apparatuses for providing unique event notifications is described. In one embodiment, an object accessor accesses an object that represents hardware. A notification value accessor acceses a notification value. A universally unique identifier (UUID) accessor accesses a UUID, and a unique action designator computes a unique action designation based on the notification value and the UUID.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Software System and Functional Overviews

As already stated, there is a need for a way of providing event notification interfaces that a company can create without divulging confidential information or IP to a standards committee, such as the ACPI standards committee, that allows companies to develop value added features and that is not limited in the number of event notification interfaces than can be provided. Further, there is a need for event notification interfaces that can easily evolve through the typical lifecycle of event notification interfaces.

Figure 1:
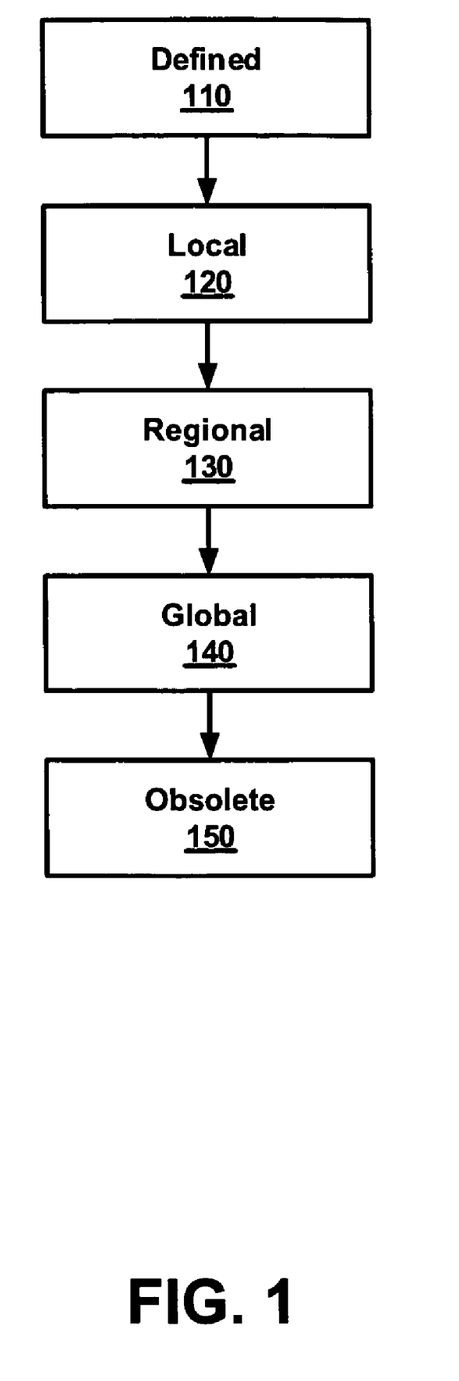
FIG. 1 depicts a block diagram of the lifecycle of an event notification interface.

FIG. 1 depicts a block diagram of the lifecycle of an event notification interface. For example, typically an event notification interface is first "defined" (110) for a particular product or model line of products. For the sake of brevity and clarity, the illustrations from hereon shall refer to "product" rather than "product or model line of products." Then it is used "locally" (120) for a particular product of one company, for example. Then it can be used "regionally" (130) for products of more than one company. Then it becomes "global" (140) when it is becomes an industry standard, for example, because it is used for many products of a particular type for many companies that produce that type of product. Then eventually it falls out of use and therefore, becomes "obsolete" (150).

As a result of the lifecycle depicted in FIG. 1, there is a need for a way of providing event notification interfaces that satisfies many business needs for companies developing products. For example, there is a need for event notification interfaces that can be created easily for local use. Secondly, there is a need for event notification interfaces that can be used locally for one product does not conflict with the event notification interfaces that are used locally for other products. Thirdly, there is a need for event notification interfaces that can easily evolve from being used locally to being used regionally and can even easily evolve to being used globally. Fourthly, there is a need for one product to easily be able to use an event notification interface that is being used locally by another product. Lastly, there is a need for there to not be a limit on the number of event notification interfaces that can be provided. Embodiments of the present invention provide, among other things, methods and apparatuses for providing unique event notification interfaces that address the business needs listed above.

Figure 2:
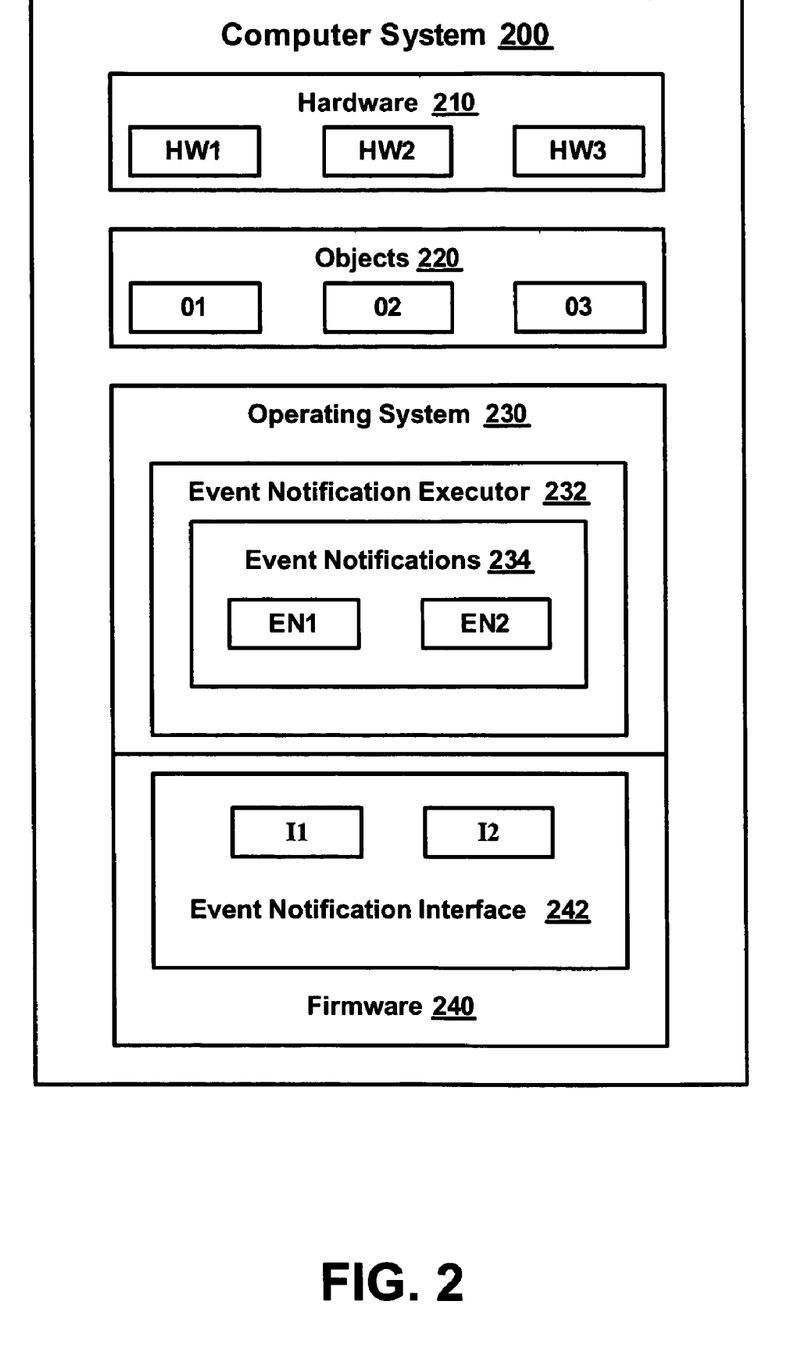
FIG. 2 is a block diagram of an exemplary computer system in which embodiments of the present invention can be implemented.

FIG. 2 is a block diagram of an exemplary computer system in which embodiments of the present invention can be implemented. The blocks in FIG. 2 can be arranged differently than as illustrated, and can implement additional or fewer features than what are described herein. Further, the features depicted by the blocks in FIG. 2 can be combined in various ways.

In the FIG. 2 embodiment, the system computer includes hardware 210, an operating system 230, and firmware 240. There are various objects 220 that can represent the hardware 210. Each object can represent a different piece of hardware 210. For example, object O1 can represent hardware HW1, object O2 can represent hardware HW2, etc. The objects 220 can be arranged in a tree like structure, for example, with platforms that use ACPI.

According to embodiments of the present invention, the firmware 240 uses event notification interfaces to create event notifications 234. Additionally, according to embodiments of the present invention, each event notification interface (e.g., I1, I2) is unique and can be used to create respective event notifications 234 (e.g., EN1, EN2) that are also unique. For example, event notification interface I1 is unique and can be used to create a unique event notification EN1. Further, event notification interface I2 is unique and can be used to create a unique event notification EN2.

The firmware 240 communicates the event notifications 234 to the operating system 230 to request that the operating system 230 perform actions on the hardware 210, according to another embodiment. The operating system 230 includes an event notification executor 232 that executes the event notification. The execution of the event notification results in a particular action being performed on a particular piece of hardware 210. For example, each event notification interface and hence, each event notification, uses a unique action designation for designating what actions are to be performed on hardware 210 and references objects 220 that represent the hardware 210, as will be explained in more detail.

A Pattern for Describing Unique Event Notification Interfaces

Figure 3:
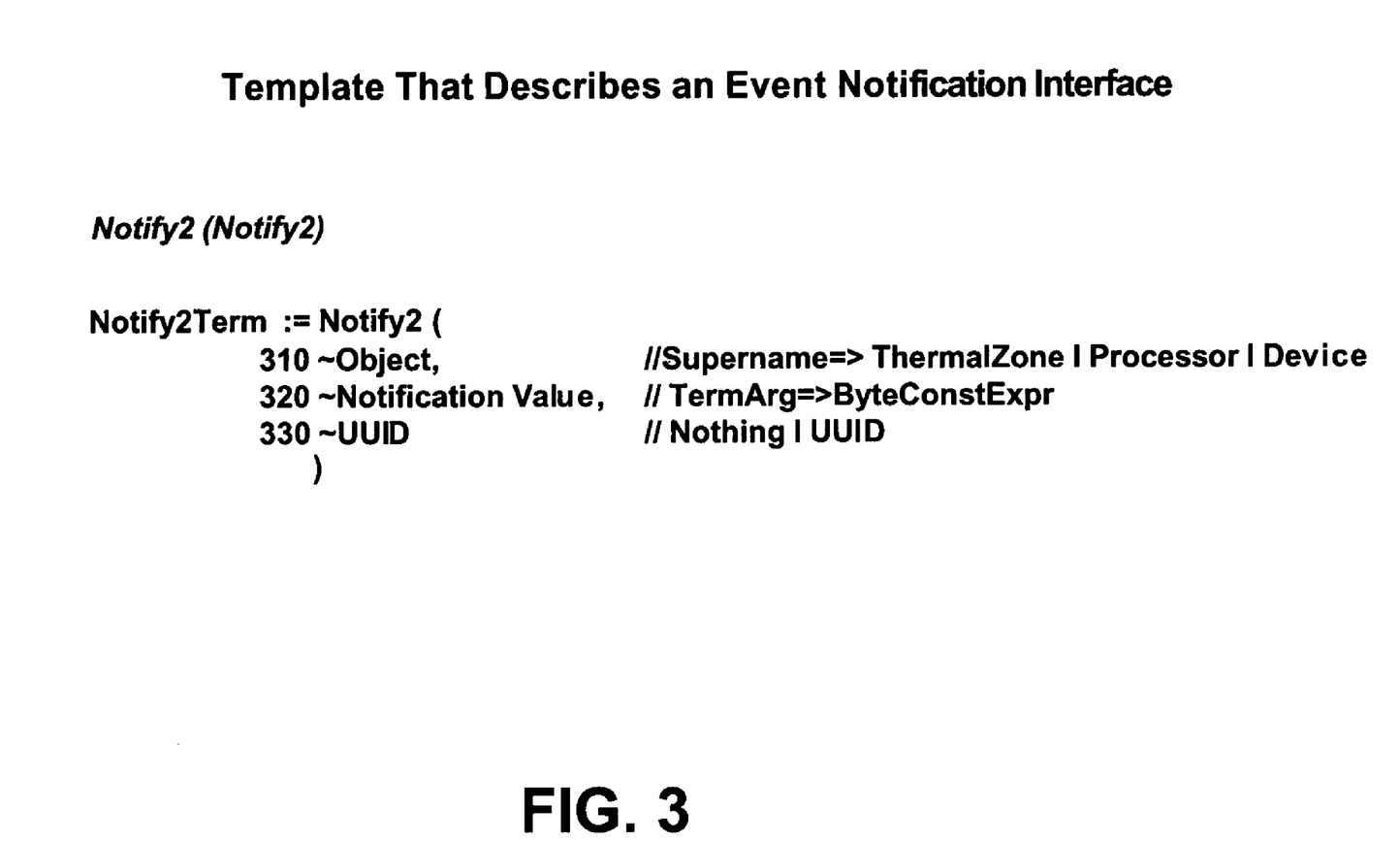
FIG. 3 illustrates a pattern for describing unique an event notification interfaces, according to embodiments of the present invention.

FIG. 3 illustrates a pattern for describing unique event notification interfaces, according to embodiments of the present invention. The Bacchus Naur Format is used for describing the event notification interface in FIG. 3. The pattern includes a first parameter 310, a second parameter 320, and a third parameter 330. The first parameter 310 is a reference for accessing an object that represents hardware, according to one embodiment. For example, the first parameter 310 can be a reference for accessing object O1 (FIG. 2) that represents hardware HW1 (FIG. 2), a reference for accessing object O2 (FIG. 2) that represents hardware HW2 (FIG. 2), and so on.

The second parameter 320 is for a notification value, according to another embodiment. The notification value can be 1 byte long, for example, as is the case with notification values used with the legacy event notification interfaces 242. Further, the notification value may have been already assigned by a standards committee, such as the ACPI standards committee.

The third parameter 330 is for a universally unique identifier, according to yet another embodiment. A UUID is a number that is unique from all other UUIDs. There are software tools that can be used for generating UUIDs. Typically, the software tools use a time stamp and the network address of the computer systems 200 that the software tools execute on as a part of generating UUIDs. Although, UUIDs are commonly 128 bytes long, for the sake of brevity and clarity, the illustrations herein shall depict 4 digit UUIDs.

The pattern can be used for coding event notification interfaces 242, according to still another embodiment. Each unique combination created from a pair of notification value and UUID results in a unique event notification interface, according to yet another embodiment. For example, a company may be developing a new piece of hardware A. To configure computer systems 200 with hardware A, two new event notification interfaces, in this illustration, will be needed for configuring computer systems 200 by adding the hardware A to the computer systems 200 and potentially deleting the hardware A from the computer systems 200. Two UUIDs (e.g., 1234 and 5678) can be generated, using software tools as already described herein, in order to create the two new and unique event notification interfaces.

The event notification interface for adding the hardware can be coded, for example, with a notification value of 0X80 and a UUID of 1234, as depicted in Table 1 below, and the second event notification interface for deleting the hardware can be coded, for example, with a notification value of 0X80 and a UUID of 5678, as depicted in Table 2 below, thus, then the two event notification interfaces are unique with respect to each other.

TABLE 1

| code for an event notification interface for adding hardware |
| --- |
| Notify2 (reference_to_object_O1, 0x80, 1234); |

TABLE 2 code for an event notification interface for deleting hardware

Notify2 (reference_to_object_O1, 0x80, 5678);

As a result, the operating system 230 can differentiate between the two event notifications that are created by the two event notification interfaces depicted in Tables 1 and 2 above. Although the above examples, were depicted using a reference to object O1, a notification value of 0x80, and UUIDs 1234 and 5678, unique event notification interfaces can be created using references to other objects, other notification values, and other UUIDs, according to embodiments of the present invention.

Hence, the pattern depicted in FIG. 3 can be used on platforms that use ACPI, according to one embodiment. Values that a standards committee, such as the ACPI standards committee, has already assigned for legacy notification values can be used without resulting in conflicting event notification interfaces 242, according to another embodiment. For example, assuming that the standards committee has already assigned the notification value 0x80 to a legacy event notification interface, the action designated by the unique action designation computed from 0X80 and 1234 will not conflict with the action designated by only the notification value 0x80 for the legacy event notification interface.

Computing the unique action designation based on the notification value and the UUID results in a unique action designation that does not require authorization from a standards committee. Therefore, a company that develops an event notification interface that uses a UUID that result in a particular unique action designation will not have to divulge confidential information or intellectual property to the ACPI standards committee. Further, the company is not limited to when the ACPI standards committee is in session. Additionally, the company can easily use the event notification interfaces to develop "value added features" to their products without being limited by the ACPI standards committee.

An Apparatus for Providing a Unique Event Notification

Figure 4:
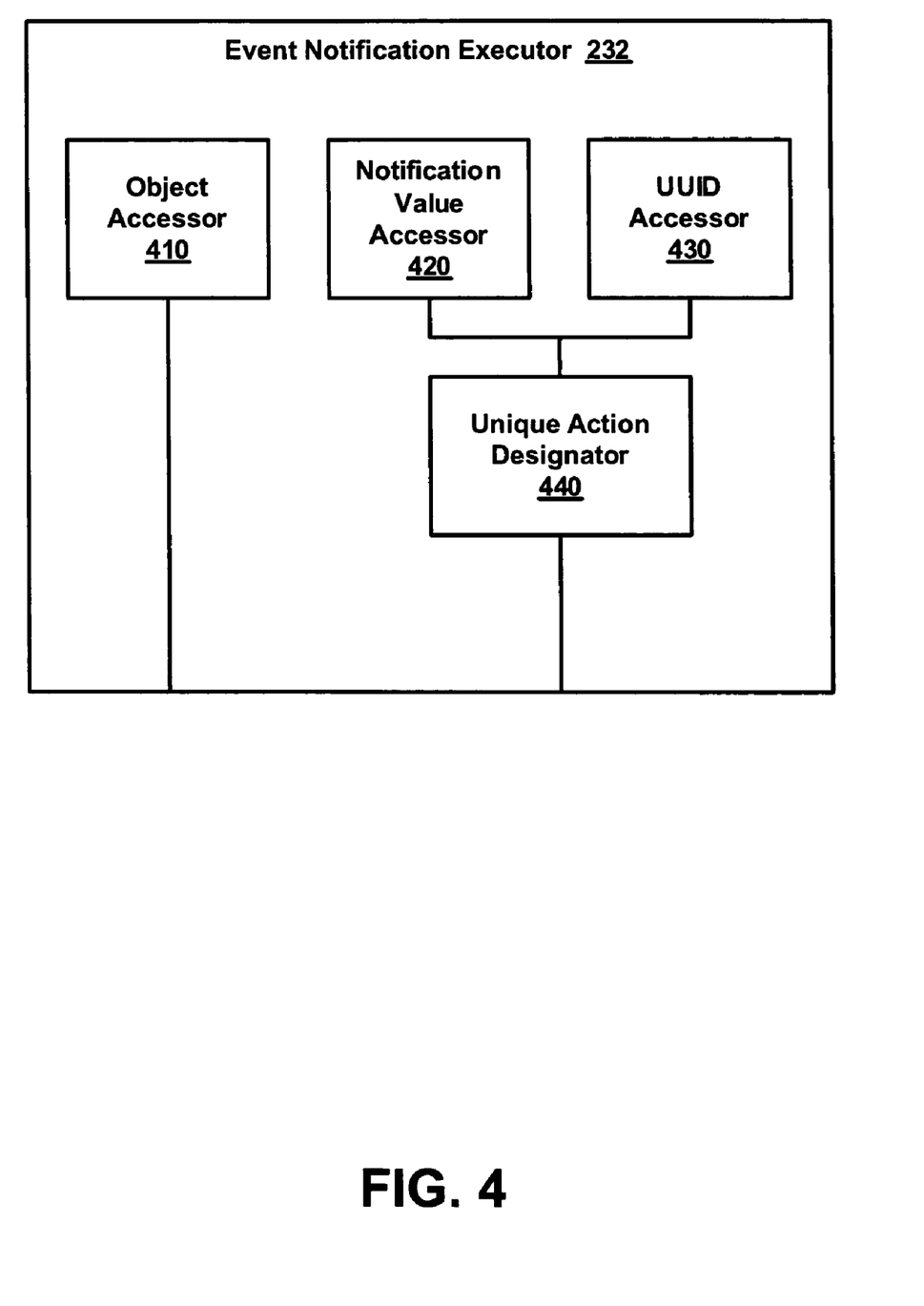
FIG. 4 is a block diagram of an event notification executor, according to embodiments of the present invention.

FIG. 4 is a block diagram of an event notification executor, according to embodiments of the present invention. The blocks in FIG. 4 can be arranged differently than as illustrated, and can implement additional or fewer features than what are described herein. Further, the features depicted by the blocks in FIG. 4 can be combined in various ways.

In the FIG. 4 embodiment, the event notification executor 232 includes an object accessor 410, a notification value accessor 420, a UUID accessor 430, and a unique action designator 440. To illustrate how the event notification executor 232 can work according to embodiments of the invention, assume that event notification interface I1 (FIG. 2) is coded using the pattern depicted in FIG. 3 with a first parameter that references object O1 (FIG. 2), a notification value 0X80 and a UUID 1234, as depicted in Table 1. In this illustration, assume that the combination of notification value 0X80 and UUID 1234 indicates that hardware HW1 (FIG. 1) is to be added to a computer system 200 (FIG. 2), for example, because an administrator has indicated that they want the hardware HW1 to be added to computer system 200 (FIG. 2) which results in the event notification interface I1 (FIG. 1) being executed.

When the firmware 240 executes the unique event notification interface I1 the respective unique event notification EN1 (FIG. 1) is created, according to one embodiment. As a result, the first, second, and third parameters associated with the event notification interface I1 can be associated with the event notification EN1. The firmware 240 can communicate the event notification EN1 to the operating system 230 to request that the operating system 230 add the hardware HW1 to the computer system 200. The operating system 230 can use an event notification executor 232 to execute the event notification EN1.

Figure 5:
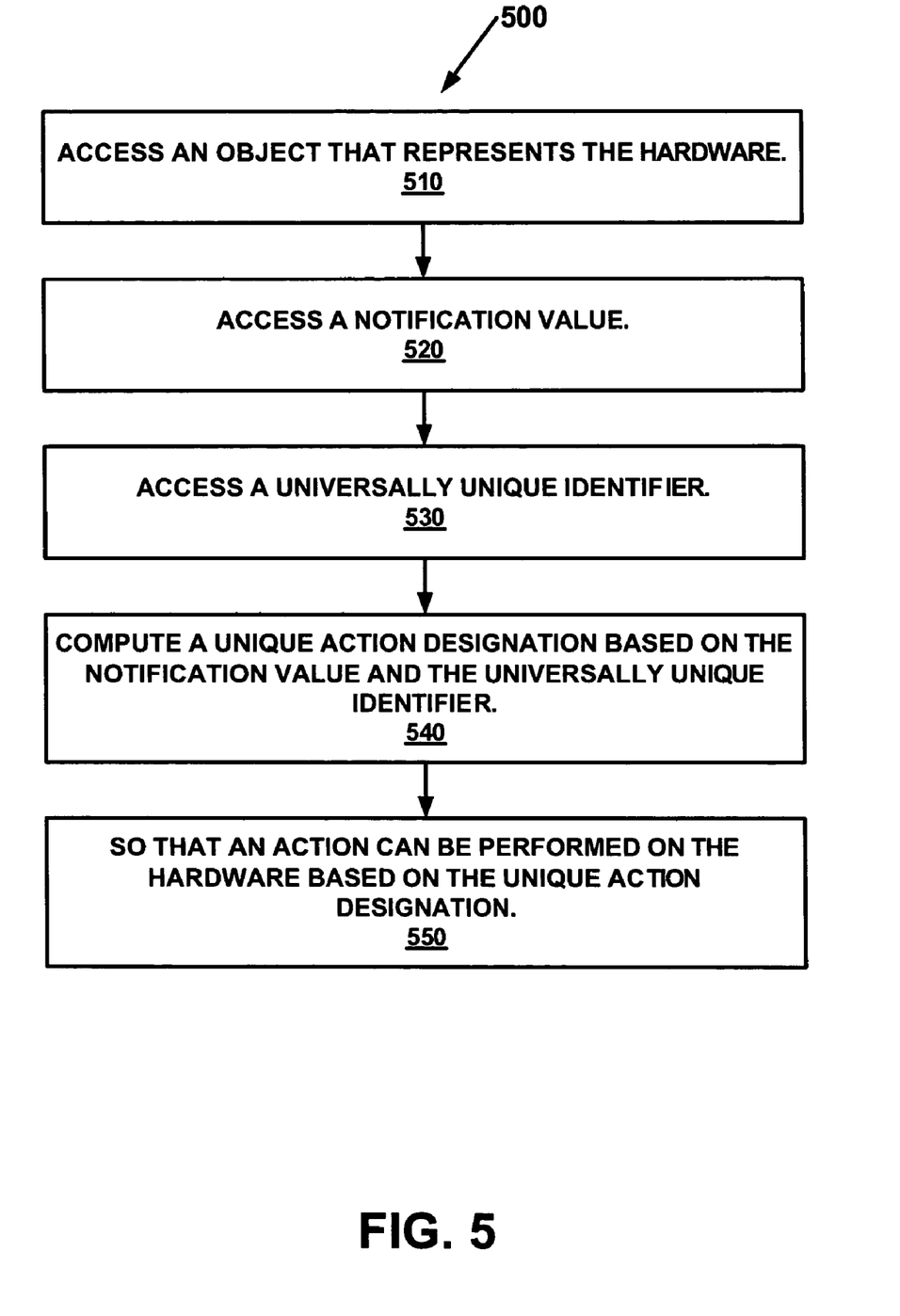
FIG. 5 depicts a flowchart for a method of providing a unique event notification for performing an action on hardware, according to embodiments of the present invention.

FIG. 5 depicts a flowchart for a method of providing a unique event notification for performing an action on hardware, according to embodiments of the present invention. For the purposes of illustrating the method, the discussion of flowchart 500 shall refer to the structures depicted in FIGS. 1, 2, 3, and 4. In executing the event notification EN1, the object accessor 410 associated with the event notification executor 232 uses the first parameter 310 of the event notification EN1 to reference the object O1 (510). The notification accessor 420 uses the second parameter 320 of the event notification EN1 to obtain the notification value 0X80 (520). The UUID accessor 430 uses the third parameter 330 of the event notification EN1 to obtain the UUID 1234 (530). The unique action designator 440 uses the notification value 0x80 with the UUID 1234 to compute a unique action designation (540) which uniquely identifies an action that can be performed on a piece of hardware (550). In this illustration, the unique action is to add hardware HW1 to the computer system 200. An action performer can use the first parameter 310 that references object O1 (FIG. 1) and the unique action designator 440 to add hardware HW1 (FIG. 1) to the computer system 200, according to one embodiment.

Although specific steps are disclosed in flowchart 500, such steps are exemplary. That is, embodiments of the present invention are well suited to performing various other steps or variations of the steps recited in flowchart 500. It is appreciated that the steps in flowchart 500 may be performed in an order different than presented, and that not all of the steps in flowchart 500 may be performed. All of, or a portion of, the embodiments described by flowchart 500 can be implemented using computer-readable and computer-executable instructions which reside, for example, in computer-usable media of a computer system 200 or like device.

CONCLUSION

By using a UUID to code event notification interfaces, according to embodiments of the invention, unique event notification interfaces can be provided without a company divulging confidential information or IP to a standards committee, value added features can be developed, and the limit on the number of event notification interfaces is alleviated. Further, event notification interfaces can easily be provided, for example, solely for the purposes of testing hardware. Further, a event notification interface, according to embodiments, can easily evolve through the typical lifecycle, depicted in FIG. 1, of an event notification interface without conflicting with other event notification interfaces.

Further, by using a UUID to code event notification interfaces, according to embodiments of the present invention, the event notification interfaces can accommodate the following business needs of a company. For example, the need for event notification interfaces that can be created easily for local use. Secondly, the need for event notification interfaces that can be used locally for one product does not conflict with the event notification interfaces that are used locally for other products.

Thirdly, the need for event notification interfaces that can easily evolve from being used locally to being used regionally and can even easily evolve to being used globally. Fourthly, the need for one product to easily be able to use an event notification interface that is being used locally by another product. Lastly, the need for there to not be a limit on the number of event notification interfaces that can be provided.

Unique event notifications are provided as the result of providing unique event notification interfaces, according to an embodiment of the present invention.

What is claimed is:

1. An apparatus for creating a unique event notification, comprising:
    a memory;
    an object accessor configured to access an object that represents hardware;
    a notification value accessor configured to access a notification value;
    a universally unique identifier (UUID) accessor configured to access a UUID that is generated by a computer system that the apparatus is associated with;
    a unique action designator configured to compute a unique action designation based on the notification value and the UUID, wherein firmware is enabled to request that an operating system perform a unique action determined based on the unique action designation and wherein the firmware and the operating system are associated with the computer system;
    an action performer configured to perform the unique action on the hardware, wherein the unique action is determined based on the unique action designation;
    wherein:
    an event notification interface creates an event notification that includes a reference to the object, the notification value, and the UUID;
    the action performer performs the unique action on the hardware by executing the event notification; and
    the event notification interface communicates the event notification from the firmware associated with the computer system to the operating system associated with the computer system.

2. The apparatus of claim 1, wherein:
    the hardware is selected from a group consisting of a device, a processor, and a thermal zone.

3. The apparatus of claim 1, wherein:
    the notification value can be assigned a value that has already been used by legacy event notification interfaces.

4. The apparatus of claim 1, wherein:
    the unique action designation is a unique number that does not conflict with any legacy notification values.

5. A computer-implemented method of providing a unique event notification for performing a unique action on hardware, the method comprising:
    accessing an object that represents the hardware;
    accessing a notification value;
    accessing a universally unique identifier (UUID) that is generated by a computer system;
    computing a unique action designation based on the notification value and the UUID, wherein firmware is enabled to request that an operating system perform the unique action on the hardware and wherein the unique action is determined based on the unique action designation;
    creating an event notification that includes a reference to the object, the notification value, and the UUID;
    performing the unique action on the hardware by executing the event notification; and
    communicating the event notification from the firmware associated with the computer system to the operating system associated with the computer system.

6. The method as recited in claim 5, wherein the accessing the object that represents the hardware further comprises:
    accessing the object that represents the hardware that is selected from a group consisting of a device, a processor, and a thermal zone.

7. The method as recited in claim 5, wherein the accessing the notification value further comprises:
    accessing the notification value that has been assigned a value that is already used by legacy event notification interfaces.

8. The method as recited in claim 5, wherein the computing the unique action designation based on the notification value and the UUID results in the unique action designation not conflicting with any legacy notification values.

9. The method as recited in claim 5, wherein the computing the unique action designation based on the notification value and the UUID further comprises:
    providing a unique action designation that does not require authorization from a standards committee.

10. A computer-readable storage medium having computer-readable program code embodied therein for causing a computer system to perform a method of providing a unique event notification for performing a unique action on hardware, the method comprising:
    accessing an object that represents the hardware;
    accessing a notification value;
    accessing a universally unique identifier (UUID) that is generated by the computer system; and
    computing a unique action designation based on the notification value and the UUID, wherein firmware is enabled to request that an operating system perform the unique action on the hardware and wherein the unique action is determined based on the unique action designation;
    creating an event notification that includes a reference to the object, the notification value, and the UUID;
    performing the unique action on the hardware by executing the event notification; and
    communicating the event notification from the firmware associated with the computer system to the operating system associated with the computer system.

11. The computer-readable medium as recited in claim 10, wherein the computer-readable program code embodied therein causes the computer system to perform the method, wherein the accessing the notification value further comprises:
    accessing the notification value that has been assigned a value that is already used by legacy event notification interfaces.

12. The computer-readable medium as recited in claim 10, wherein the computer-readable program code embodied therein causes the computer system to perform the method, wherein the computing the unique action designation based on the notification value and the UUID results in the unique action designation not conflicting with any legacy notification values.

* * * * *

UNITED STATES PATENT AND TRADEMARK OFFICE
CERTIFICATE OF CORRECTION

PATENT NO. : 7,519,973 B2 Page 1 of 1
APPLICATION NO. : 10/951956
DATED : April 14, 2009
INVENTOR(S) : Dong Wei It is certified that error appears in the above-identified patent and that said Letters Patent is hereby corrected as shown below:

On the Title page, in Item (54), in "Title", in column 1, line 1, after "PROVIDING" insert -- A --.

On drawing sheet 1 of 5, in Fig. 1, above box "110", insert -- LIFECYCLE OF AN EVENT NOTIFICATION INTERFACE --.

In column 1, line 1, after "PROVIDING" insert -- A --.

Signed and Sealed this

Eighth Day of September, 2009

David J. Kappos
*Director of the United States Patent and Trademark Office*